United States Patent
Fukuda et al.

(10) Patent No.: US 9,457,440 B2
(45) Date of Patent: Oct. 4, 2016

(54) CHATTERING VIBRATION PREVENTING JIG FOR WORKPIECE

(71) Applicant: Okuma Corporation, Niwa-Gun (JP)

(72) Inventors: Yoshitaka Fukuda, Niwa-Gun (JP); Ryo Suzuki, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 72 days.

(21) Appl. No.: 14/509,273

(22) Filed: Oct. 8, 2014

(65) Prior Publication Data
US 2015/0130122 A1    May 14, 2015

(30) Foreign Application Priority Data

Nov. 11, 2013 (JP) .................. 2013-233323

(51) Int. Cl.
- B25B 1/24 (2006.01)
- B23Q 3/08 (2006.01)
- B23Q 17/09 (2006.01)
- B23Q 11/00 (2006.01)

(52) U.S. Cl.
CPC ........... *B23Q 3/084* (2013.01); *B23Q 11/0032* (2013.01); *B23Q 17/0976* (2013.01); *B23C 2250/16* (2013.01); *Y10T 409/304312* (2015.01)

(58) Field of Classification Search
USPC ......... 269/257; 409/163–164, 189, 197–198, 409/205, 219–225
See application file for complete search history.

(56) References Cited

U.S. PATENT DOCUMENTS

| | | | | |
|---|---|---|---|---|
| 3,874,753 A * | 4/1975 | Naito | ............... | A47B 47/0041 211/186 |
| 3,955,607 A * | 5/1976 | Roche | .............. | B27C 5/10 144/154.5 |
| 4,227,839 A * | 10/1980 | Conway | .............. | B25H 1/0092 408/112 |
| 4,904,022 A * | 2/1990 | Morozzi | ............... | A47C 3/00 108/156 |
| 5,492,160 A * | 2/1996 | McCracken | ......... | B23Q 9/0085 144/144.51 |
| 5,769,442 A * | 6/1998 | Robinson | ................ | A61G 5/10 280/281.1 |
| 5,911,180 A * | 6/1999 | Mullens | ............... | A47B 96/028 108/153.1 |
| 5,997,229 A * | 12/1999 | Akers | ...................... | A47G 3/00 411/372.5 |
| 6,550,739 B1 * | 4/2003 | Brindisi | .............. | A47G 1/1613 248/476 |
| 7,217,059 B1 * | 5/2007 | Rudduck | ............... | E04B 2/7457 403/277 |
| 2011/0226384 A1 * | 9/2011 | Kinsler | ..................... | B27C 1/14 144/278.1 |
| 2012/0232812 A1 * | 9/2012 | Okita | ................. | B23Q 17/0976 702/56 |
| 2012/0263967 A1 * | 10/2012 | Toyoda | .................... | B21C 1/24 428/586 |
| 2012/0297721 A1 * | 11/2012 | Rempel | ................ | E04B 1/2608 52/655.1 |
| 2013/0239690 A1 * | 9/2013 | Tadano | ................ | A61B 5/0051 73/644 |
| 2014/0341644 A1 * | 11/2014 | Maertens | ............... | A47B 95/00 403/297 |

FOREIGN PATENT DOCUMENTS

| | | |
|---|---|---|
| JP | 2004-066362 A1 | 3/2004 |
| JP | 2008-087138 A1 | 4/2008 |

\* cited by examiner

*Primary Examiner* — Alvin Grant
(74) *Attorney, Agent, or Firm* — Burr & Brown, PLLC

(57) ABSTRACT

A chattering vibration preventing jig is made of metal, and is L-shaped as viewed from the side. A horizontal plate portion has a pair of cuts extending in the short-side direction from an end of the horizontal plate portion. A vertical plate portion has a plurality of screw holes arranged in a line in the long-side direction. Screws slightly longer than lengths of the screw holes are screwed into the corresponding screw holes to abut onto a workpiece. Adhesive is applied to abutment surfaces of the screws that abut onto the workpiece.

16 Claims, 3 Drawing Sheets

the entirety of which is incorporated by reference.

CHATTERING VIBRATION PREVENTING JIG FOR WORKPIECE

BACKGROUND OF THE INVENTION

This application claims the benefit of Japanese Patent Application Number 2013-233323 filed on Nov. 11, 2013, the entirety of which is incorporated by reference.

FIELD OF THE INVENTION

The present invention relates to a chattering vibration preventing jig for workpiece for preventing chattering vibration generated in a workpiece during machining of the workpiece by a machine tool.

DESCRIPTION OF RELATED ART

During machining of a workpiece by a machine tool, chattering vibration is generated in the workpiece in some cases since a force produced by a tool acts on the workpiece. To avoid generation of the chattering vibration, one of possible methods may be easing of machining conditions. Since the method may decrease the machining efficiency, however, an alternative method is employed in which a chattering vibration preventing jig is used as disclosed in Japanese Patent Application Publication No. 2008-87138, for example. According to the disclosure, a chattering vibration preventing jig includes a jig body containing a permanent magnet in a lower part of the jig body, and a bolt screwed into a fixing nut and containing a permanent magnet in an upper part of the bolt. The bolt is screwed into the jig body. The chattering vibration preventing jig is attached as a tension rod between a carrying table and a workpiece so that the workpiece is pressed and prevented from deflection. Therefore, generation of chattering vibration can be avoided. Moreover, Japanese Patent Application Publication No. 2004-66362 discloses a workpiece support device which includes an abutment unit, a follower support unit, and a fixing support unit. The abutment unit includes an oscillation lever which supports a support pin at the upper end of the oscillation lever. The support pin is brought into abutment with a workpiece. The follower support unit pre-presses the lower part of the oscillation lever. The fixing support unit presses the upper part of the pre-pressed oscillation lever.

According to the foregoing chattering vibration preventing jig and workpiece support device, however, it is difficult to control the degree of deflection of a workpiece caused by pressing and also difficult to set the chattering vibration preventing jig and the workpiece support device. In addition, it is troublesome to detach them.

SUMMARY OF THE INVENTION

Accordingly, it is an object of the invention to provide a chattering vibration preventing jig for workpiece in which the chattering vibration preventing jig is easily attachable and detachable, and easily controls the degree of deflection of a workpiece.

For achieving the above object, a first aspect of the invention is directed to a chattering vibration preventing jig for workpiece in which the chattering vibration preventing jig is fixed to a base jig of a machine tool in a condition of abutment between the chattering vibration preventing jig and a workpiece fixed to the base jig, and prevents chattering vibration generated during machining of the workpiece. The chattering vibration preventing jig includes a screw that advances and withdraws with respect to the workpiece by turning of the screw and comes into abutment with the workpiece when advancing, and adhesive that is applied to an abutment surface of the screw abutting onto the workpiece.

The "base jig" stated herein refers to a jig corresponding to a base for fixing a workpiece. Examples of the base jig include not only a component formed separately from a table or the like and attached to a table or the like, but also a table, a pallet, a chuck and others to which a workpiece is directly fixed.

A second aspect of the invention is directed to the chattering vibration preventing jig for workpiece according to the first aspect of the invention, wherein a plurality of the screws are provided.

According to the first aspect of the invention, the chattering vibration preventing jig is easily attachable, the degree of deflection of the workpiece is easily controlled and setting of the chattering vibration preventing jig is easily performed. In addition, detachment after the end of the machining is not laborious. Needless to say, easing of the machining conditions is not needed.

According to the second aspect of the invention, the chattering vibration preventing jig includes a plurality of the screws. The chattering vibration preventing jig offers not only the advantages of the first aspect of the invention, but also an additional advantage of preventing chattering vibration throughout a wide range. Particularly, appropriate pressing in correspondence with the shape of the workpiece is easily applied even when an abutment surface of the workpiece is not flat but has curves or bends.

DETAILED DESCRIPTION OF THE INVENTION

An embodiment according to the invention is hereinafter described with reference to the drawings.

Figure 1:
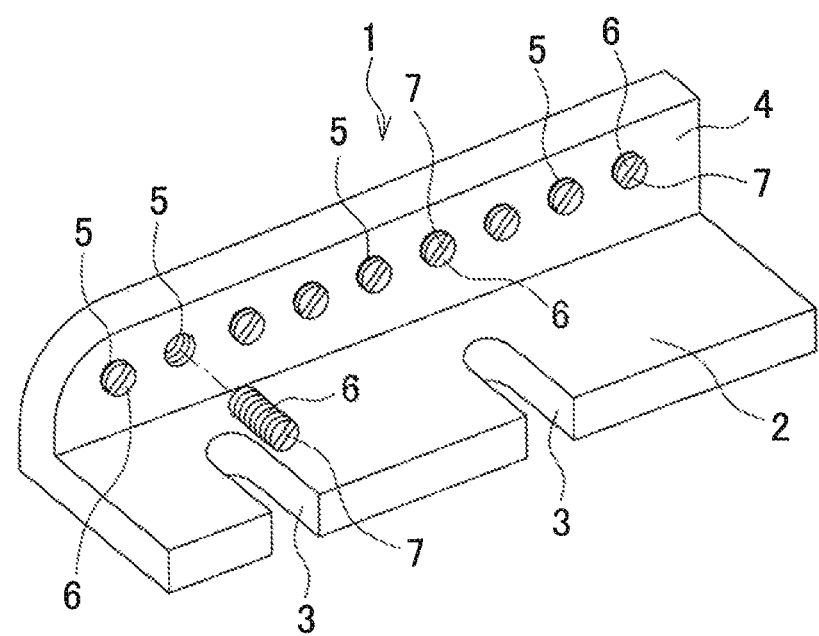
FIG. 1 is a perspective view of a chattering vibration preventing jig.

FIG. 1 is a perspective view illustrating an example of a chattering vibration preventing jig for workpiece. The chattering vibration preventing jig 1 is made of metal, and is L-shaped as viewed from the side. A horizontal plate portion 2 has a pair of cuts 3 extending in the short-side direction from an end of the horizontal plate portion 2. A vertical plate portion 4 has a plurality of screw holes 5 arranged in a line in the long-side direction. Screws 6 slightly longer than lengths of the screw holes 5 are screwed into the corresponding screw holes 5. At least one groove 7 is formed in one end surface of each of the screws 6 and configured to catch a tip of a screwdriver or the like.

Figure 2:
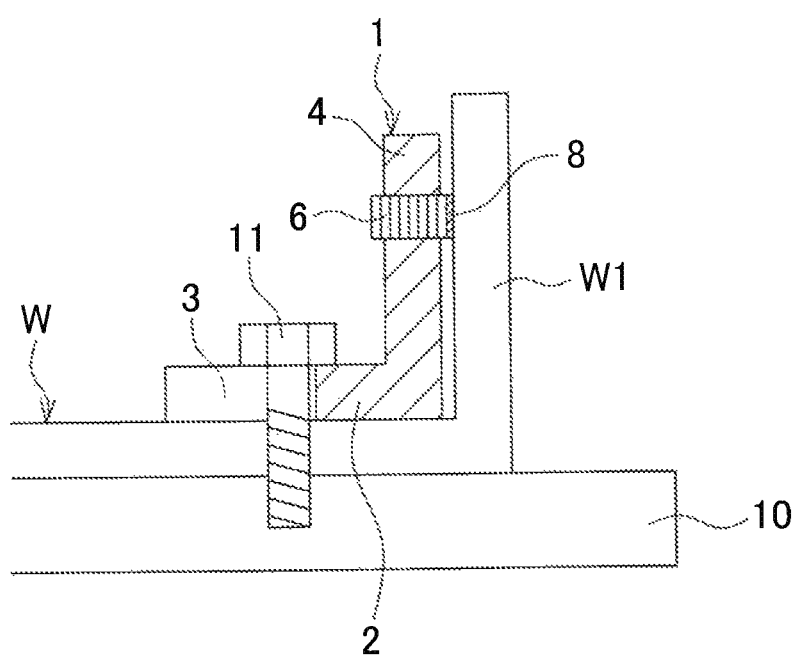
FIG. 2 illustrates a condition of the chattering vibration preventing jig during use.

The chattering vibration preventing jig 1 thus constructed is attached to a workpiece W fixed to a base jig 10 in a manner illustrated in FIG. 2, for example. The base jig 10 is provided on a not-shown table of a machine tool. The L-shaped workpiece W having a thin-plate portion W1 at an end of the workpiece W is fixed to the base jig 10 by bolts 11. According to the embodiment, the chattering vibration preventing jig 1 is attached to the workpiece W in such a manner that the vertical plate portion 4 of the chattering vibration preventing jig 1 is slightly pressed against the thin-plate portion W1, and then the bolts 11 are inserted through the cuts 3 to fix the chattering vibration preventing jig 1 to the base jig 10 via the workpiece W. In the above state, due to irregularity of an abutment surface of the thin-plate portion W1 that abuts on the vertical plate portion 4, clearances are produced between the surface of the thin-plate portion W1 and the vertical plate portion 4.

Figure 3A:
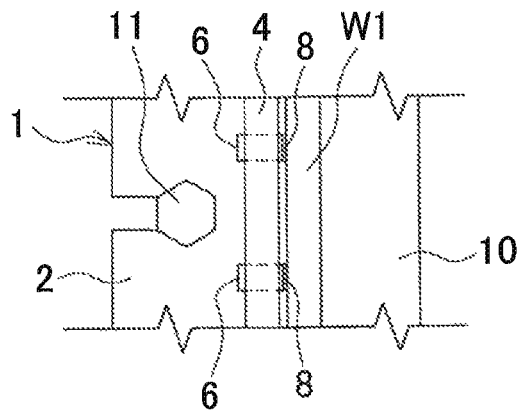
FIG. 3A is a plan view of the chattering vibration preventing jig in the condition shown in FIG. 2.

Under the above condition, the respective screws 6 are turned and advanced toward the thin-plate portion W1 so that ends of the screws 6 abut onto the thin-plate portion W1 as illustrated in FIG. 3A. Then, the thin-plate portion W1 is pressed to a desired degree of deflection. Adhesive 8 is applied to the other end surface of each of the screws 6 facing to the thin-plate portion W1, and therefore, the screws 6 and the thin-plate portion W1 are combined into one body and the thin-plate portion W1 is fixed.

Accordingly, during machining of external surface or upper surface of the thin-plate portion W1 of the workpiece W by using a tool with the chattering vibration preventing jig 1 attached to the workpiece W, generation of chattering vibration is effectively prevented since the thin-plate portion W1 is fixed by the chattering vibration preventing jig.

After the end of machining, the respective screws 6 are turned in the loosening direction. As a result, the screws 6 even fixed with the adhesive 8 are easily separated and withdrawn from the thin-plate portion W1. The bolts 11 are loosened, and then the chattering vibration preventing jig is detached.

Accordingly, the chattering vibration preventing jig 1 in the above embodiment is provided with the screws 6 which advance and withdraw with respect to the thin-plate portion W1 of the workpiece W by turning of the screws 6, so that the screws 6 come into abutment with the thin-plate portion W1 when advancing. Moreover, the adhesive 8 is applied to the abutment surfaces of the screws 6 abutting on the thin-plate portion W1. Therefore, attachment of the chattering vibration preventing jig 1 is easily performed, and the degree of deflection of the workpiece W is easily controlled. In addition, setting of the chattering vibration preventing jig 1 is easily performed, and detachment after the end of the machining is not laborious. Needless to say, easing of the machining conditions is not needed.

Particularly, the structure which includes a plurality of the screws 6 according to the embodiment allows prevention of chattering vibration throughout a wide range. In addition, appropriate pressing in correspondence with the shape of the workpiece is easily applied particularly when the abutment surface of the workpiece is not flat but has curves or bends.

According to the embodiment, the chattering vibration preventing jig is attached to the workpiece. However, this is not restrictive, and when an inside surface of the thin-plate portion is machined, for example, the chattering vibration preventing jig is directly attached to the base jig. In this case, the workpiece and the chattering vibration preventing jig may be directly provided on a table used as a base jig without providing a base jig on the table. Alternatively, the workpiece may be fixed to a chuck used as a base jig, and the chattering vibration preventing jig may be attached to the chuck, for example.

The shape of the workpiece is not limited to an L-shape. The chattering vibration preventing jig is applicable to a workpiece having other shapes such as a T shape or a plate shape.

Moreover, the shape of the chattering vibration preventing jig itself may be modified in design in accordance with the shape of the workpiece, including increase or decrease of the numbers of the screw holes and the screws, use of headed screws, change of the arrangement of the screw holes and screws (such as plural row arrangement and staggered arrangement), shapes other than an L shape (such as a right-triangular shape).

Figure 3B:
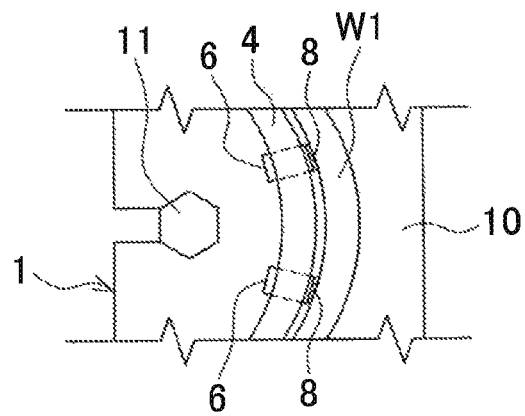
FIG. 3B is a modified example of the chattering vibration preventing jig when a thin-plate portion of a workpiece has a circular-arc shape.
Figure 3C:
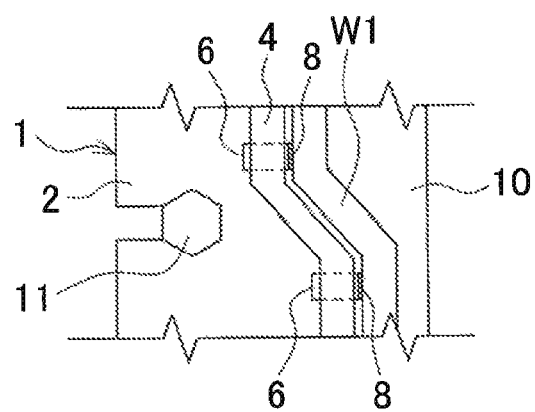
FIGS. 3C and 3D are modified examples of the chattering vibration preventing jig when a thin-plate portion of a workpiece has a bended shape.
Figure 3D:
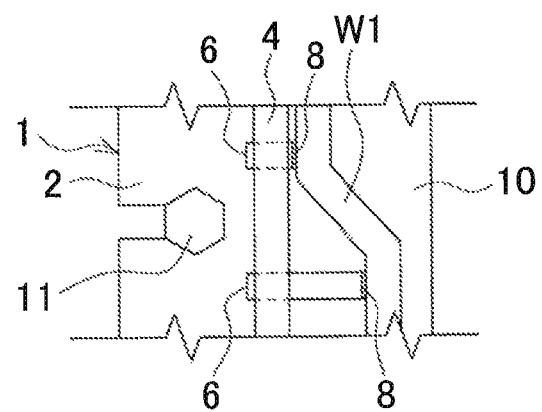

More specifically, when the thin-plate portion W1 is circular-arc-shaped as illustrated in FIG. 3B, for example, the vertical plate portion 4 may be circular-arc-shaped in accordance with the shape of the thin-plate portion W1. When the thin-plate portion W1 is bended as illustrated in FIG. 3C, the vertical plate portion 4 may be bended in accordance with the shape of the thin-plate portion W1, or may abut onto the thin-plate portion W1 by changing the lengths of the screws 6 as illustrated in FIG. 3D. Needless to say, these modifications may be combined in accordance with the shape of the workpiece.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A chattering vibration preventing jig, for preventing chattering vibration generated during machining of a workpiece by a machine tool, comprising:
    a first side extending in a first direction and a second side extending in a second direction perpendicular to the first direction forming an L-shape when viewed from an end side thereof;
    the second side having a plurality of screw holes formed therein;
    a plurality of screws; and
    an adhesive,
    wherein prior to machining the workpiece that is fixed to the machine tool, the first side of the chattering vibration preventing jig is fixed to a base jig of a machine tool in a condition of abutment between the second side and the workpiece,
    the adhesive is applied to a first end surface of each of one or more of the plurality of screws that are inserted into one or more of the plurality of screw holes in the second side, respectively, each of the one or more screws then is inserted into one of screw holes with the first end side facing toward the workpiece,
    each of the one or more screws being advanced or withdrawn within the respective screw hole by turning the screw, each screw is advanced until the first end surface of the screw abuts against the workpiece, and
    the adhesive fixes the first end surface of each of the one or more screws to the workpiece.

2. The chattering vibration preventing jig according to claim 1, wherein the first side of the chattering vibration preventing jig further comprises cuts, and the first side of the chattering vibration preventing jig is fixed to base jig of the machine tool by bolts that are inserted through the cuts.

3. The chattering vibration preventing jig according to claim 1, wherein turning each of the one or more screws until the first end surface abuts against the workpiece deflects the workpiece such that a degree of deflection of the workpiece is adjustable and is controlled by the chattering vibration preventing jig.

4. The chattering vibration preventing jig according to claim 1, wherein the second side has a circular arc shape.

5. The chattering vibration preventing jig according to claim 1, wherein the second side is one of bent and shaped to correspond to a shape of the workpiece.

6. The chattering vibration preventing jig according to claim 1, wherein the workpiece is fixed to a chuck being used as the base jig of the machine tool, and the chattering vibration preventing jig is fixed to the chuck.

7. The chattering vibration preventing jig according to claim 1, wherein the workpiece and the chattering vibration preventing jig are provided on a table being used as the base jig of the machine tool.

8. The chattering vibration preventing jig according to claim 1, wherein the base jig comprises one of a table, a pallet and a chuck to which at least the workpiece is directly fixed.

9. A chattering vibration preventing jig, for preventing chattering vibration generated during machining of a workpiece by a machine tool, comprising:
   a first side extending in a first direction and a second side extending in a second direction perpendicular to the first direction forming a T-shape when viewed from an end side thereof;
   the second side having a plurality of screw holes formed therein;
   a plurality of screws; and
   an adhesive
   wherein prior to machining the workpiece that is fixed to the machine tool, the first side of the chattering vibration preventing jig is fixed to a base jig of a machine tool in a condition of abutment between the second side and the workpiece,
   the adhesive is applied to a first end surface of each of one or more of the plurality of screws that are inserted into one or more of the plurality of screw holes in the second side, respectively; each of the one or more screws then is inserted into one of the screw holes with the first end side facing toward the workpiece,
   each of the one or more screws being advanced or withdrawn within the respective screw hole by turning the screw, each screw is advanced until the first end surface of the screw abuts against the workpiece, and
   the adhesive fixes the first end surface of each of the one or more screws to the workpiece.

10. The chattering vibration preventing jig according to claim 9, wherein the first side of the chattering vibration jig further comprises cuts, and the first side of the chattering vibration preventing jig is fixed to base jig of the machine tool by bolts that are inserted through the cuts.

11. The chattering vibration preventing jig according to claim 9, wherein turning each of the one or more screws until the first end surface abuts against the workpiece deflects the workpiece such that a degree of deflection of the workpiece is adjustable and is controlled by the chattering vibration preventing jig.

12. The chattering vibration preventing jig according to claim 9, wherein the second side has a circular arc shape.

13. The chattering vibration preventing jig according to claim 9, wherein the second side is one of bent and shaped to correspond to a shape of the workpiece.

14. The chattering vibration preventing jig according to claim 9, wherein the workpiece is fixed to a chuck being used as the base jig of the machine tool, and the chattering vibration preventing jig is fixed to the chuck.

15. The chattering vibration preventing jig according to claim 9, wherein the workpiece and the chattering vibration preventing jig are provided on a table being used as the base jig of the machine tool.

16. The chattering vibration preventing jig according to claim 9, wherein the base jig comprises one of a table, a pallet and a chuck to which at least the workpiece is directly fixed.

* * * * *